United States Patent [19]
Kambour

[11] Patent Number: 5,100,974
[45] Date of Patent: Mar. 31, 1992

[54] BLENDS OF POLYCARBONATE, ALKYLNAPHTHALENE FORMALITE AND IMPACT MODIFIER

[75] Inventor: Roger P. Kambour, Schenectady, N.Y.

[73] Assignee: General Electric Company, Schenectady, N.Y.

[21] Appl. No.: 622,062

[22] Filed: Dec. 4, 1990

[51] Int. Cl.$^5$ ............................................. C08L 69/00
[52] U.S. Cl. ...................................... 525/465; 525/67; 525/1.46; 525/148
[58] Field of Search .................. 525/67, 146, 148, 465

[56] References Cited

U.S. PATENT DOCUMENTS

| | | | |
|---|---|---|---|
| 4,248,976 | 2/1981 | Clubley et al. | 523/506 |
| 4,515,921 | 5/1985 | Witman | 525/148 |
| 4,569,969 | 2/1986 | Jones et al. | 525/148 |
| 4,657,973 | 4/1987 | Endo et al. | 525/148 |
| 4,931,503 | 6/1990 | Boutni et al. | 525/148 |

FOREIGN PATENT DOCUMENTS

WO80/00027  1/1980  World Int. Prop. O. ......... 525/146

Primary Examiner—Paul R. Michl
Assistant Examiner—Yong S. Lee
Attorney, Agent, or Firm—William H. Pittman; James C. Davis, Jr.

[57] ABSTRACT

Blends of aromatic polycarbonate, alkylnaphthalene-formaldehyde condensation product and an impact modifier produce easy-flow, tough, stiff thermoplastics. The thermoplastics can be used to injection mold thin-walled housings for electronic circuits.

11 Claims, 15 Drawing Sheets

BLENDS OF POLYCARBONATE, ALKYLNAPHTHALENE FORMALITE AND IMPACT MODIFIER

This invention relates to blends of polycarbonate, alkyl naphthalene formalite and optionally an impact modifier.

The superior physical properties of polycarbonates, including polycarbonate blends, render them useful in many application areas. However, polycarbonates are deficient for some applications in certain properties such as stiffness, strength and melt flow properties. Therefore, there is considerable activity in the development of blends of polycarbonates with impact modifiers and plasticizers or flow modifiers.

The blends thus prepared are, however, often deficient because the addition of one material to improve one property is usually at the expense of a second beneficial property inherent in the polycarbonate. Thus, many blends of polycarbonates, plasticizers and impact modifiers have flexural moduli and tensile strengths which are lower than the original polycarbonates. Other blends of polycarbonates containing so called antiplasticizers have easier melt flow and greater stiffness and strength as solids, but poor tensile strength, ductility and impact strength.

Illustrative examples of polycarbonate blends containing impact modifiers are disclosed in U.S. Pat. Nos. 4,438,231, 4,536,538 and 4,710,534 which references are hereby incorporated by reference. The first of these discloses multiphase composite compositions comprising polycarbonate, an acrylate-methacrylate copolymer and an olefin-acrylate copolymer as an impact modifier. An alkali metal salt is present as a flame retardant. In the second, a combination of an amorphous polyester comprising units derived from 1,4-cyclohexanedimethanol an aromatic dicarboxylic acid or ester-forming derivative and an olefinacrylate copolymeric resin is disclosed as an impact modifier. In the third, a combination of an olefin-diene copolymer and an acrylonitrile-butadiene-alkenylaromatic copolymer is disclosed as an impact modifier.

Illustrative examples of experimental polycarbonate blends containing tritolyl phosphate as a plasticizer are disclosed in a series of journal articles. The three journal articles are: A. Onu, R. Legras and J. P. Mercier, *Journal of Polymer Science, Polymer Physics Edition*, 14, 1187-1199 (1976); R. Legras and J. P. Mercier, *Journal of Polymer Science, Polymer Physics Edition*, 15, 1283-1289 (1977); and R. Legras and J. P. Mercier, *Journal of Polymer Science, Polymer Physics Edition*, 17, 1171-1181 (1979).

An illustrative example of a polycarbonate blend containing a flame retardant is disclosed in U.S. Pat. No. 4,866,130. In this patent an aromatic sulfonic acid salt having a polyether side chain and an alkyl, halo, nitro, trihalomethyl or cyano substituent on the aromatic radical is disclosed as the flame retardant.

The present invention provides a class of plasticized polycarbonates which have a broad range of properties extending from impact strengths, flexural moduli and tensile strengths in excess of neat polycarbonate to low flexural moduli and low tensile strength materials. The high impact strength, high elastic modulus and high tensile strength materials are particularly useful in forming thin-walled precision injection molded housings for electronic components. Thin walls and thin support webs can be easily formed because of low melt viscosity of the materials of the present invention.

In one of its aspects, the present invention comprises a matrix of a polycarbonate with an alkylnaphthalene-formaldehyde condensation product in sufficient amount to increase the tensile strength to a value above that of a corresponding neat polycarbonate.

Said condensation product is generally prepared from at least one alkylnaphthalene having at least one alkyl substituent with 1-4 and preferably 1-2 carbon atoms, and is illustrated by the reaction product of petroleum still bottoms and formaldehyde. The petroleum still bottoms can be replaced by other alkylnaphthalene-containing materials. The condensation product, hereinafter frequently designated "alkylnaphthalene formalite", is a resin and the average molecule contains from two to four alkylnaphthalene moieties joined by methylene radicals. Each alkylnaphthalene moiety can be joined to an adjacent alkylnaphthalene moiety by a methylene radical. The specific alkylnaphthalene formalite used was Kenflex A alkylnaphthalene formalite, a product of Kenrich Petrochemicals Inc. of Bayonne, N.J.

Alkylnaphthalene formalite and formalite reactions are discussed in the following publications which are hereby incorporated by reference: "*Glasquids*": *Glassy Polymers Toughened with Mobile Diluents*, Kambour, R. P., Polymer Preparation (American Chemical Society, Division of Polymer Chemistry), 29(2), 185-6, 37-5 (Plastics Manufacture and Processing); *Study of p-Xylyl Alcohol Reactions Under Formalite Formation Conditions*, Bukhanova, S. Kh.; Bayarstanove, Zh.; Erdenova, Sh. E.; Serebryakova, T. V.; Gutsalyuk, V. G. *Izv. Akad. Nauk Kaz. SSR, Ser. Khim.*, 27(2), 61-5; 1977; Formation and Transformations of Acetal Bonds of Formalite Resins, Gutsalyuk, V. G.; Yatsenko, E. A.; Saltybaev, D. K.; Rylova, G. P., Mater. Konf. Vop. Str. Reakts. Sposobnosti Atsetalei, 2nd Meeting, Date 1967, 232-7, edited by: Ivanov, V. I., Frunze, USSR; *Sensitivity of a Formalite Reaction*, Brants, E. M.; Popov, Yu. V., *Neftepererab. Neftekhim.* (Moscow), (7), 48-9, NNNSAF, 1968.

The polycarbonate/alkylnaphthalene formalite matrix preferably contains from 80% to 99% by weight of the polycarbonate and from 1% to 20% by weight of the alkylnaphthalene formalite. If impact resistance rather than tensile strength is desired, an impact modifier can be added in an amount of from 1% to 10% by weight based upon the combined weights of the polycarbonate, alkylnaphthalene formalite and impact modifier. Preferably, the impact modifier is present at a level greater than 3% by weight. Such blends contain 70% to 98% by weight of polycarbonate, from 1% to 20% by weight of the alkylnaphthalene formalite and from 1% to 10% by weight of an impact modifier.

Suitable impact modifiers include copolymers and terpolymers of alkenylaromatic compounds, preferably styrene, with aliphatic dienes such as butadiene, olefinic nitriles such as acrylonitrile and/or olefinic esters such as alkyl acrylates or methacrylates, as well as core/shell and other grafted polymers wherein the above-designated monomers are grafted on a rubbery latex. Impact modifiers which have been crosslinked by the inclusion of units derived from, for example, divinylbenzene and are 90-100% insoluble in acetone may be employed. For the purpose of the present invention, a frequently preferred impact modifier is a butadiene-styrenemethyl methacrylate terpolymer, preferably containing on a weight percentage basis from 60% to 70% butadiene, from 10% to 30% methyl methacrylate and from 10% to 20% styrene.

One specific preferred impact modifier is Kanegafuchi ACE B56 terpolymer which contains on a weight percentage basis, 66% butadiene, 20% methyl methacrylate and 14% styrene. The impact modifier is crosslinked to the extent that it is 92% insoluble in acetone. A second specific preferred impact modifier is Acryloid KM 653 impact modifier of Rohm and Haas Co. The impact modifier used in the figures and tables was Kanegafuchi ACE B56 except for one example in FIG. 15.

The polycarbonates which are components of this invention generally comprise structural units of the formula

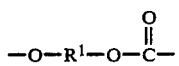  (I)

wherein each $R^1$ is a divalent aliphatic, alicyclic or aromatic radical. The $R^1$ values may be different but are usually the same and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, poly-1,4-(2-butenylene), poly-1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propylidene, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing nonhydrocarbon moieties. These may be substituents such as chloro, nitro, alkoxy and the like and also linking radicals such as thio, sulfoxy, sulfone, ester, amide, ethyl and carbonyl. Most often, however, all $R^1$ radicals are hydrocarbon radicals.

Preferably at least about 60% and more preferably at least about 80% of the total number of $R^1$ values in the polycarbonate, and most desirably all of the $R^1$ values are aromatic. The aromatic $R^1$ radicals preferably have the formula $$-A^2-Y-A^3-, \quad (II)$$

wherein each of $A^2$ and $A^3$ is a monocyclic divalent aromatic radical and Y is a bridging radical in which one or two atoms separate $A^2$ from $A^3$. The free valence bonds in formula II are usually in the meta or para positions of $A^2$ and $A^3$ in relation to Y. Frequent reference to bisphenols will be made hereinafter, but it should be understood that $R^1$ values derived from suitable compounds other than bisphenols may be employed as appropriate.

In formula II, the $A^2$ and $A^3$ values may be unsubstituted phenylene or substituted derivatives, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ and $A^3$. It is most often a hydrocarbon radical and particularly a saturated radical such as methylene, cyclohexylmethylene, 2-[2.2.2]-bicycloheptylmethylene, ethylene, 2,2-propylene, 2,2-dimethyl-1,1-propylidene, 1,1-cyclohexylene, 1,1-cyclopentadecylene, 1,1-cyclodecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, oxy, thio and sulfone. For reasons of availability and particular suitability for the purposes of this invention, the preferred radical of formula II is the 2,2-bis(4,4-phenylene)propane radical, which is derived from bisphenol A and in which Y is isopropylidene and $A^2$ and $A^3$ are each p-phenylene.

The alkylnaphthalene formalite which is used in the matrices of the present invention, Kenflex A, is received as a block. It is sold as a rubber processing aid. It is a hard brittle material of Tg=30° C. According to the manufacturer it has an average of 3 or 4 repeat units per molecule.

Prior to use, Kenflex A commercial grade alkylnaphthalene formalite was fragmented and reduced to a powder with a high intensity Henschel mixer. Blends with up to 10% alkylnaphthalene formalite were dry-mixed with the polymer powder matrix in a high-intensity Henschel mixer and extruded directly with a Werner-Pfleiderer twin screw extruder. Due to the low Tg and molecular weight of alkylnaphthalene formalite, dry mixes with greater concentrations of the alkylnaphthalene formalite were increasingly difficult to extrude: the warmth of the barrel, even with the rear heater off, was great enough to cause melting of the alkylnaphthalene formalite and slippage of the blend on the screw.

A preferred processing technique for higher levels of alkylnaphthalene formalite involved coupling two extruders together. In a Wayne single screw extruder equipped with a screw having internal water cooling, the alkylnaphthalene formalite was melted and conveyed into the Werner-Pfleiderer twin screw extruder through a melt coupling located ⅔ of the distance from the throat to the die of the latter extruder. The extrudate was chopped.

The chopped extrudate was dried for two hours at ten to twenty degrees below the blend Tg. The material was then injection molded into ⅛ inch thick test specimens in a Battenfeld 77 ton injection molding press. Barrel and mold temperatures were adjusted downward from the standard conditions for commercially available bisphenol A polycarbonate resin as required by the reductions in Tg caused by the increasing levels of plasticizer.

Figure 1:
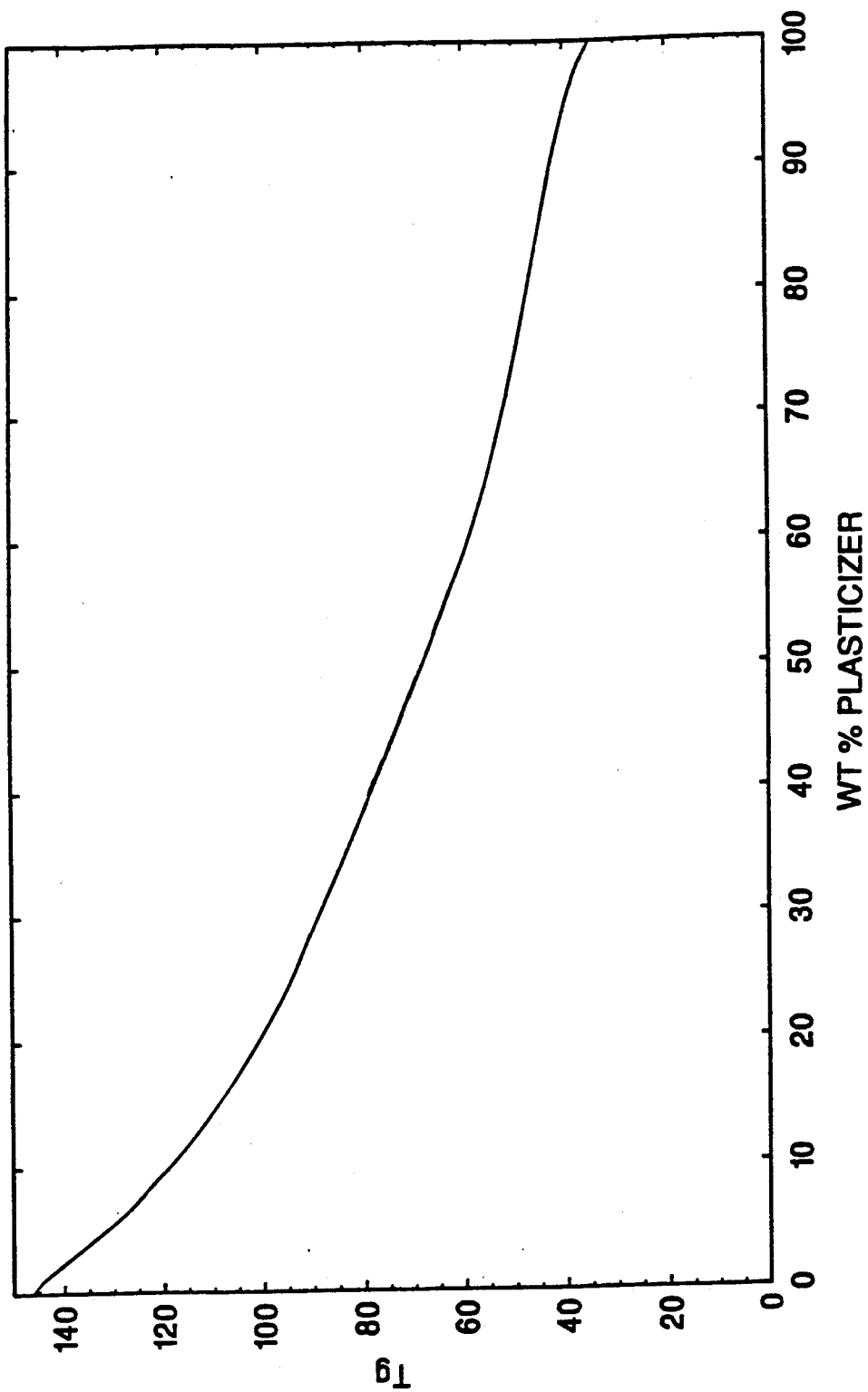
FIG. 1 shows the dependence of Tg on alkylnaphthalene formalite concentration in polycarbonate.

In the drawings and in the tables that follow:
"KFX" designates alkylnaphthalene formalite;
"PC" designates bisphenol A polycarbonate.
Glass Temperature
Resin Tg's were determined by differential scanning calorimetry at 20° C./minute with a Perkin Elmer DSC 7 Differential Scanning Calorimeter.

Flexural Moduli and Ultimate Mechanical Properties
All mechanical tests except where noted were conducted at ambient temperature about one to two days after injection molding of the given material. Tensile tests were run on ASTM minibars at 0.5 inches/minute.

The graph lines shown in the figures represent estimated average values and data points are not generally shown. In those instances where there is significant deviation from average value deviant data points are shown.

The composition dependence of Tg up to at least 30% alkylnaphthalene formalite (FIG. 1) follows conventional behavior for single phase blends. Indeed, matrices up to at least 50% alkylnaphthalene formalite are transparent (albeit colored) and thus presumably single-phase as well.

Figure 2:
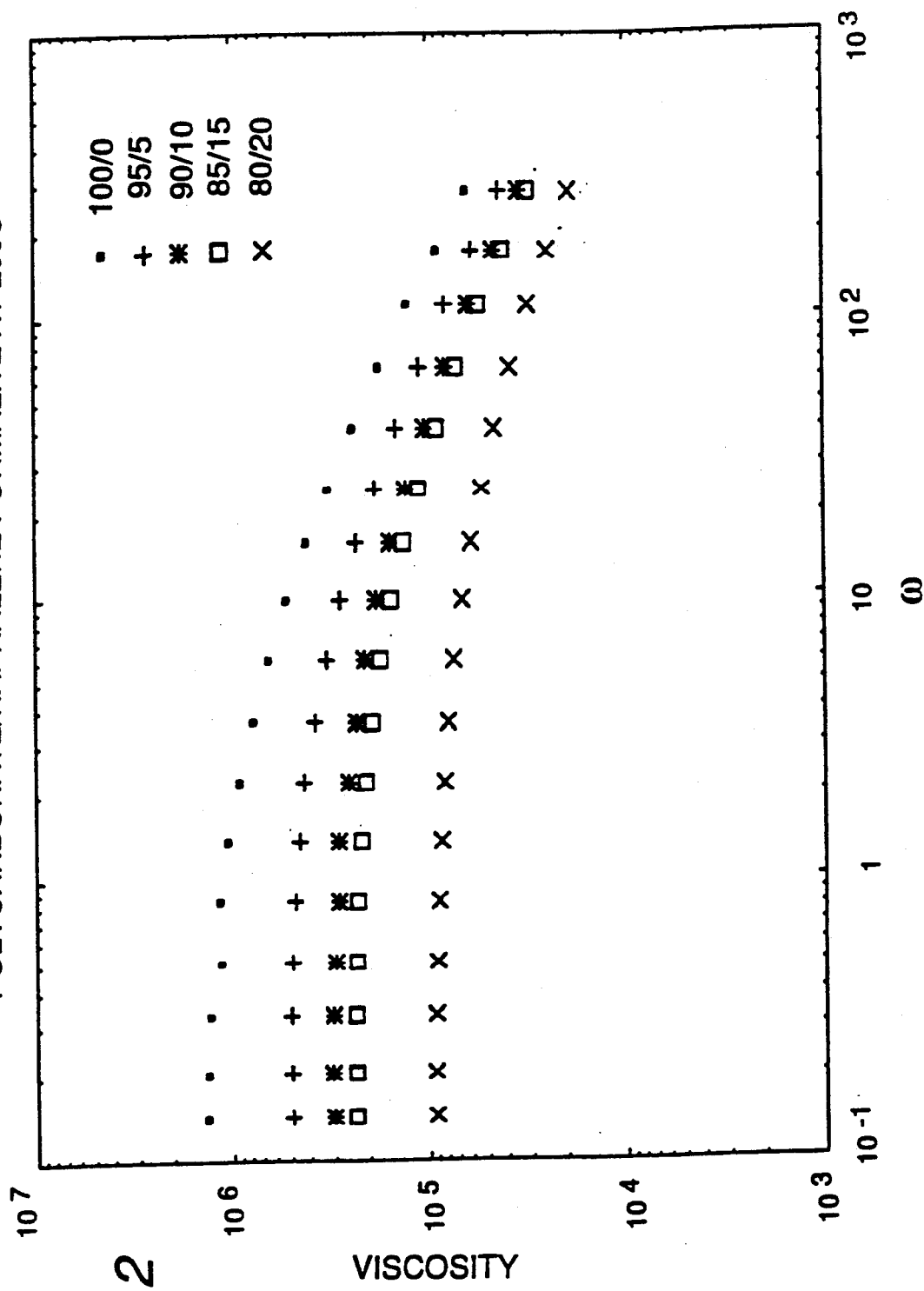
FIGS. 2, 3 and 4 show shear rate dependence of the complex viscosity at three temperatures for polycarbonate/alkylnaphthalene formalite blends.
Figure 3:
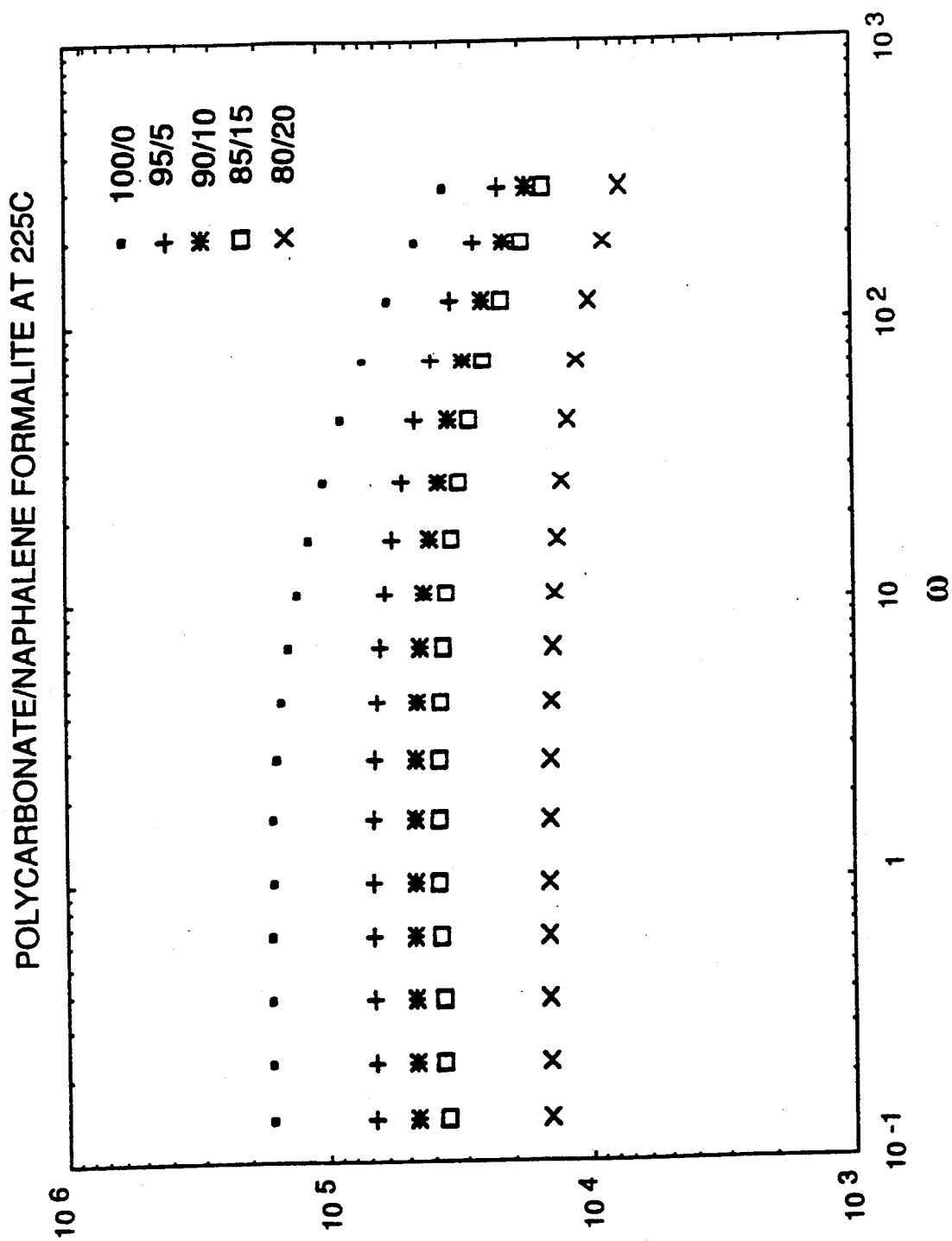
Figure 4:
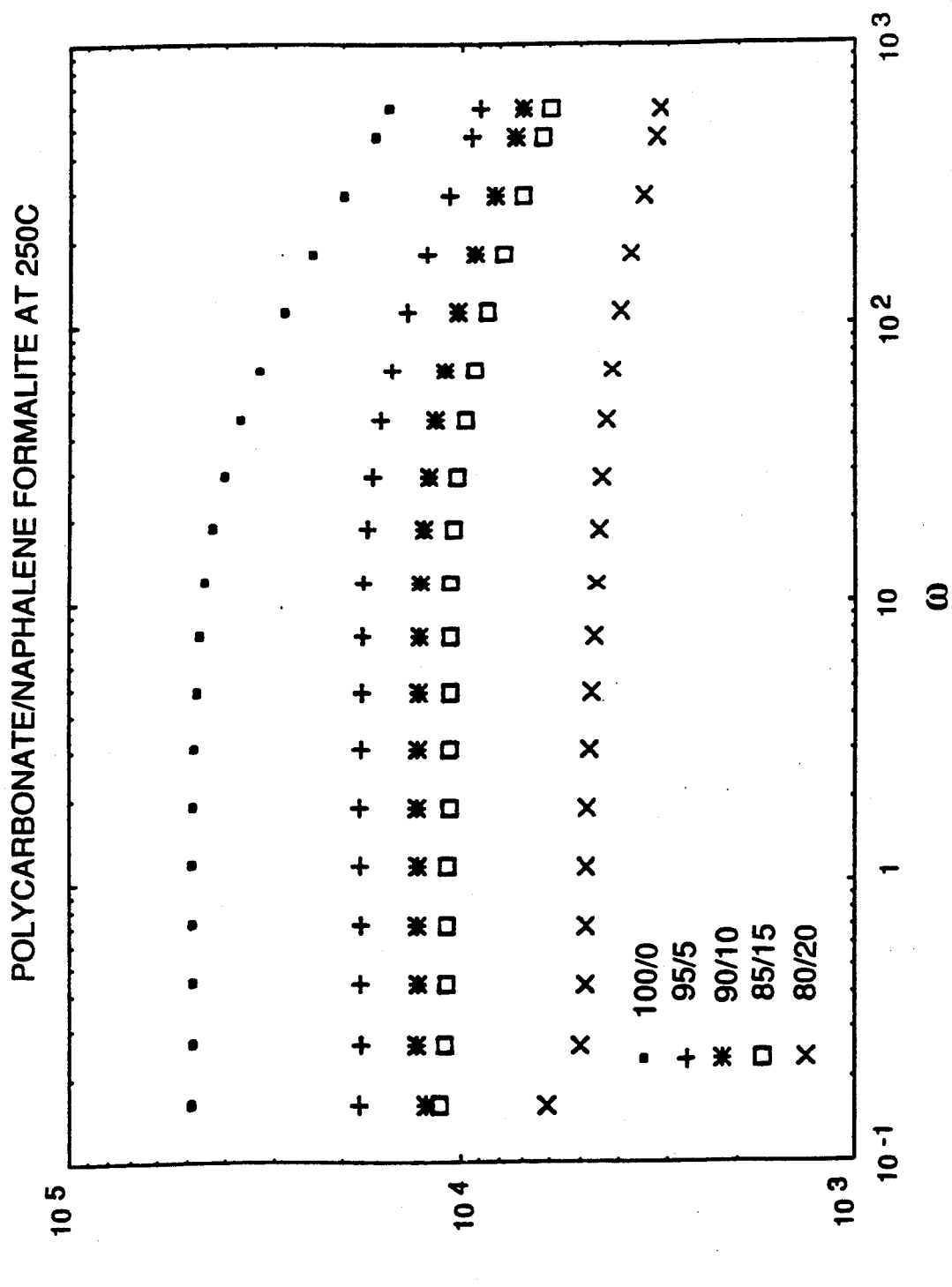
Figure 5:
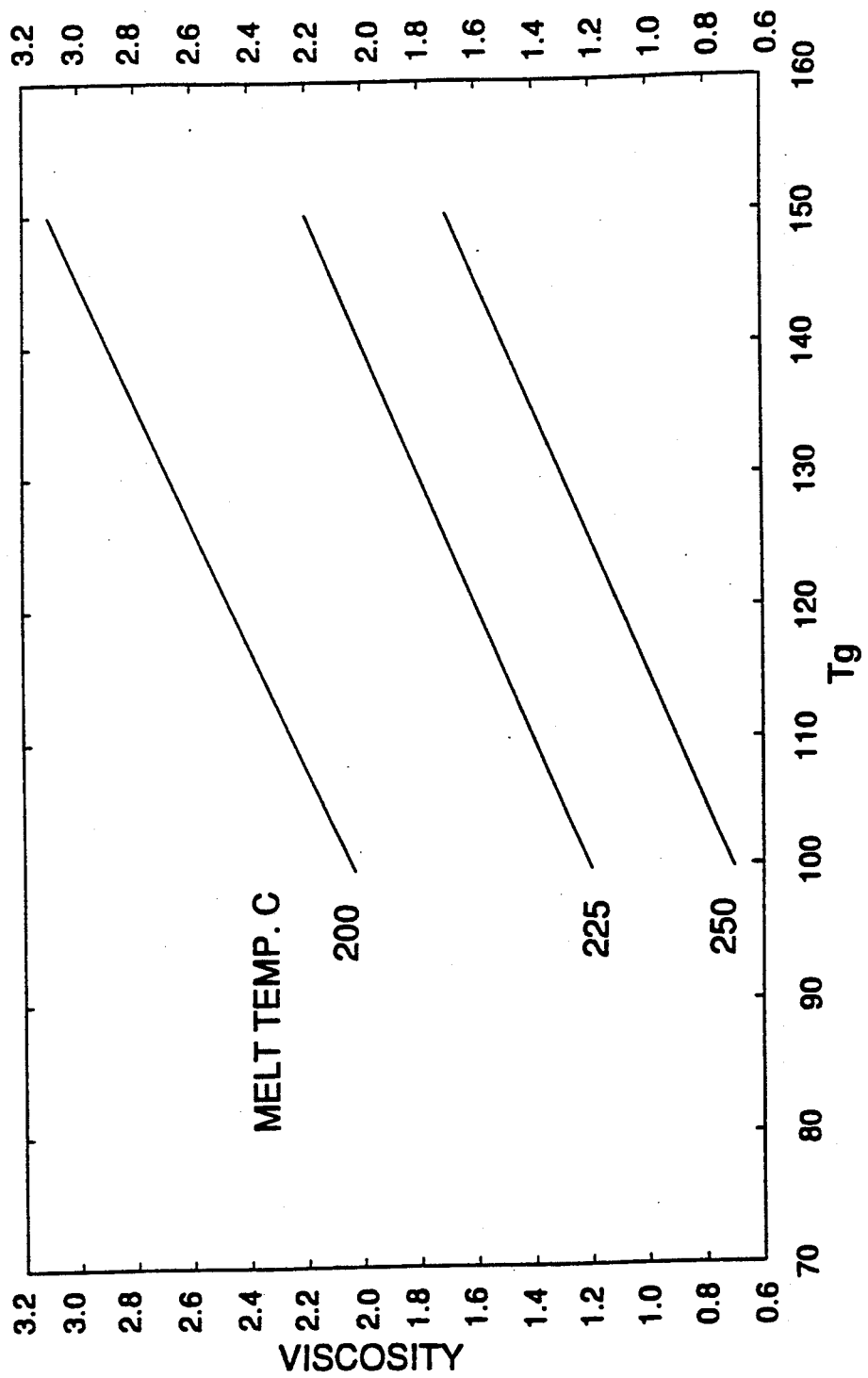
FIG. 5 shows the zero shear viscosities displayed vs. Tg.
Figure 6:
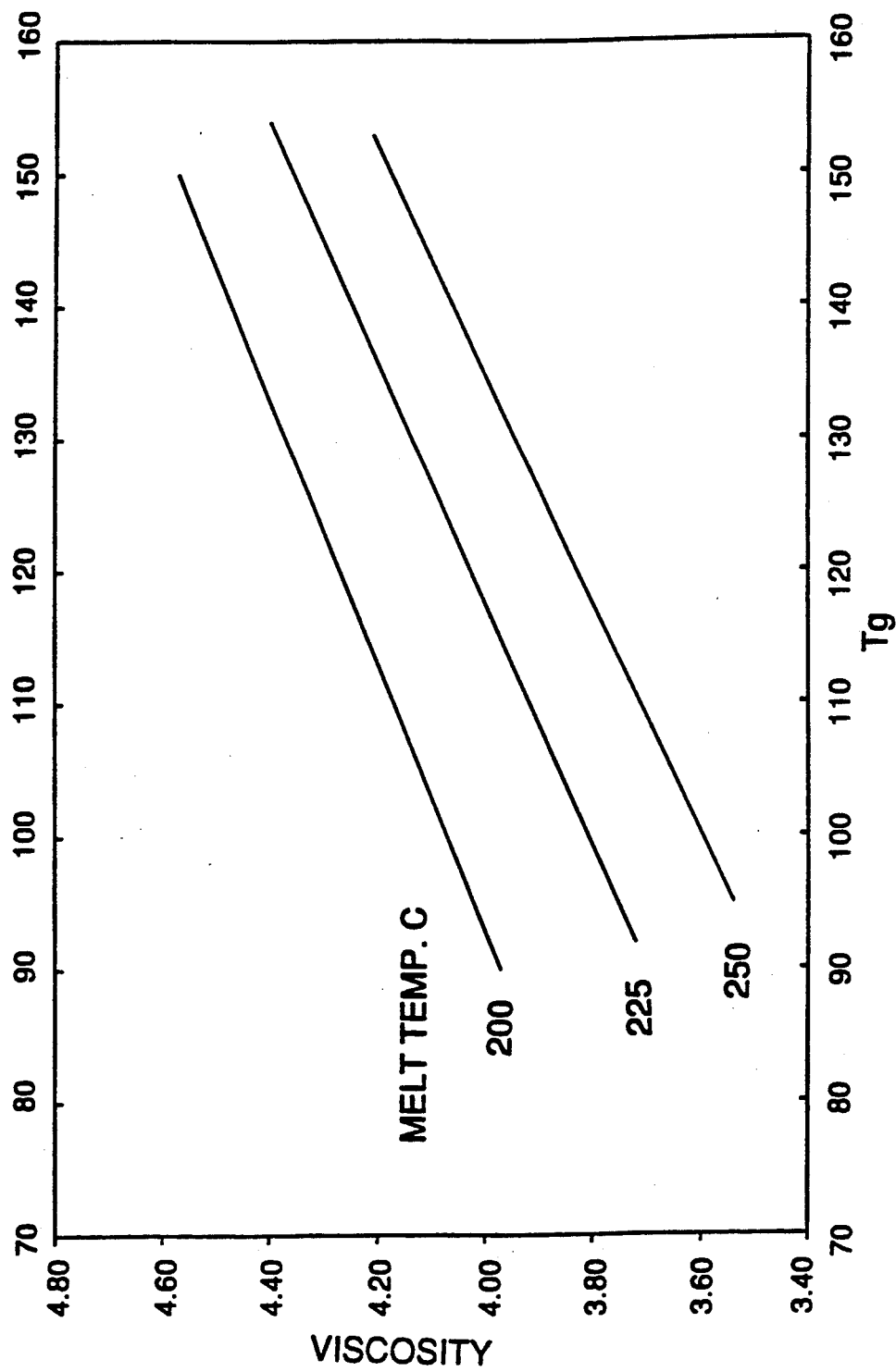
FIG. 6 shows high shear rate data.

The shear rate "omega" (the Greek letter on the graph expressed in radians/second) dependence of the complex viscosity (poise) at three temperatures is shown for polycarbonate and polycarbonate/alkylnaphthalene formalite blends without impact modifier in FIGS. 2, 3 and 4. Zero shear viscosities $(-3+\log \mu$"omega"$=0)$ are displayed versus Tg (°C.) of the blend in FIG. 5. High shear rate data (log $\mu_{500}$) and similar comparisons are shown in FIG. 6. The Tg values are in °C. throughout.

Figure 7:
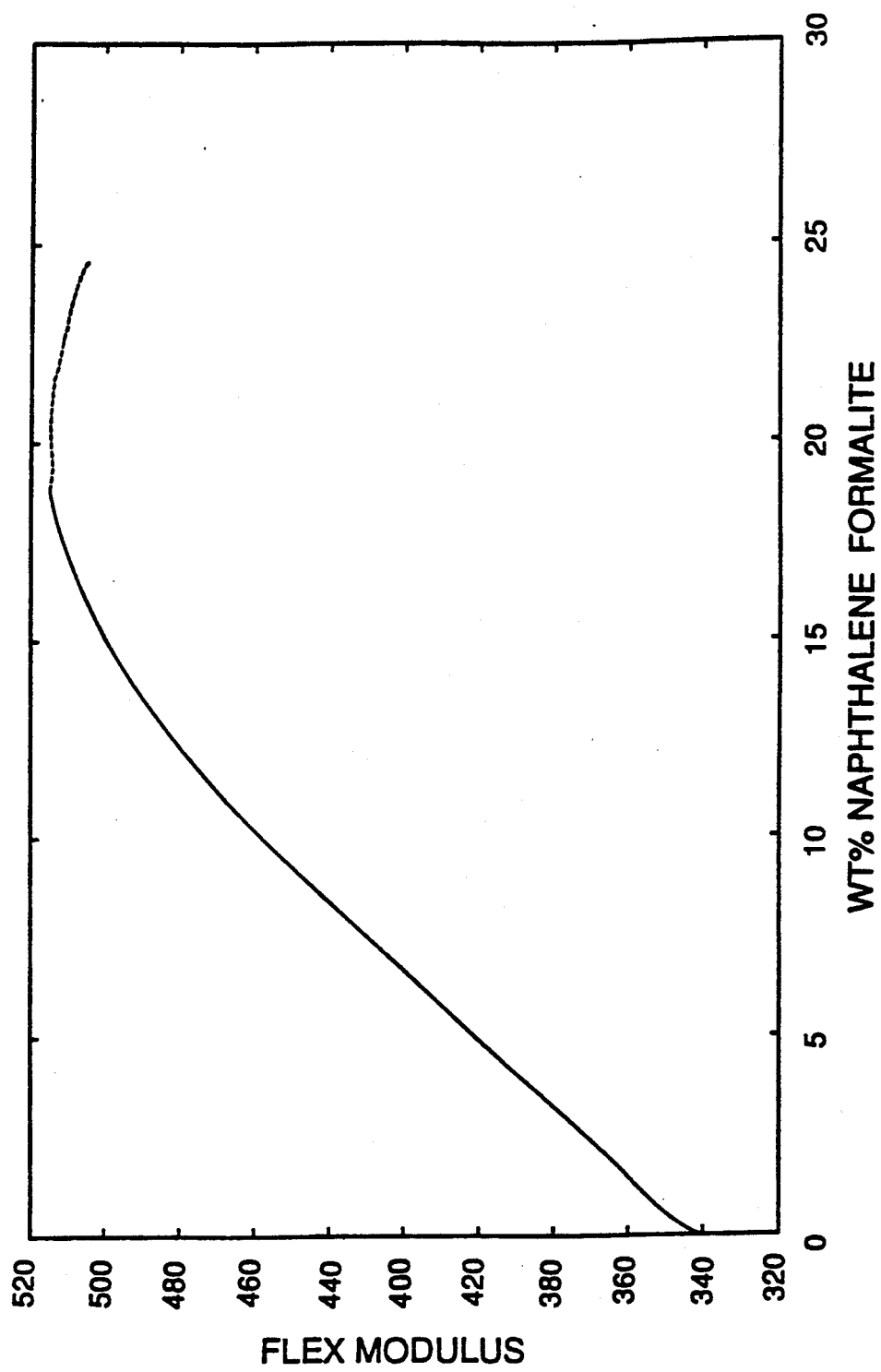
FIG. 7 shows the moduli of blends without impact modifier.

The flexural moduli (in ksi) of matrices without impact modifier are shown in FIG. 7. Alkylnaphthalene formalite is seen to produce a substantial increase in stiffness resulting in moduli greater than 50,000 psi at 20% alkylnaphthalene formalite.

Figure 8:
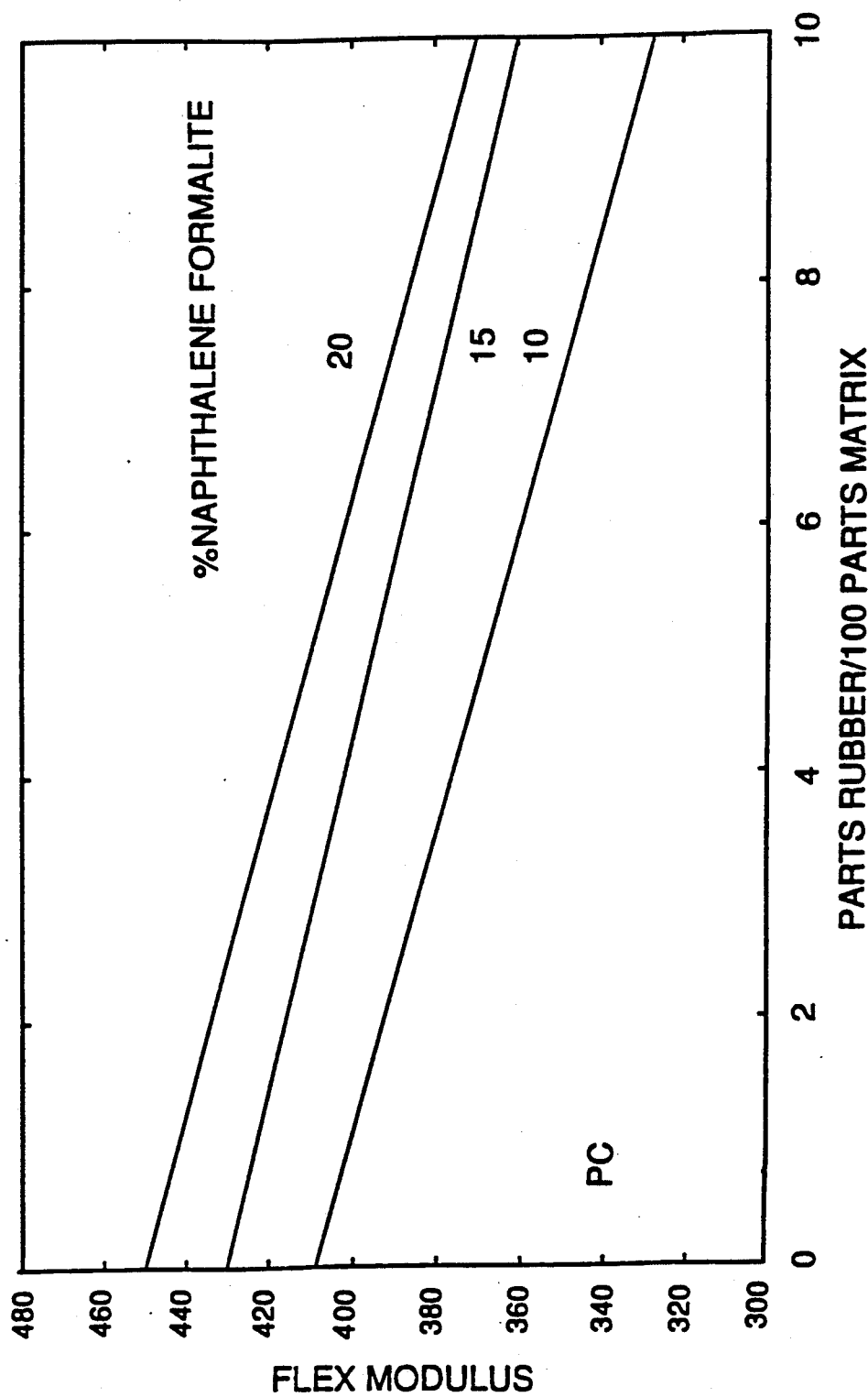
FIG. 8 shows the lowering of flexural moduli of polycarbonate/alkylnaphthalene formalite blends by impact modifier addition.

The flexural moduli (ksi) of polycarbonate/alkylnaphthalene formalite blends are lowered by impact modifier addition (FIG. 8). However, moduli of all blends with as much as 10% rubber and 10% or more alkylnaphthalene formalite are equal to or greater than the modulus of neat polycarbonate.

Figure 9:
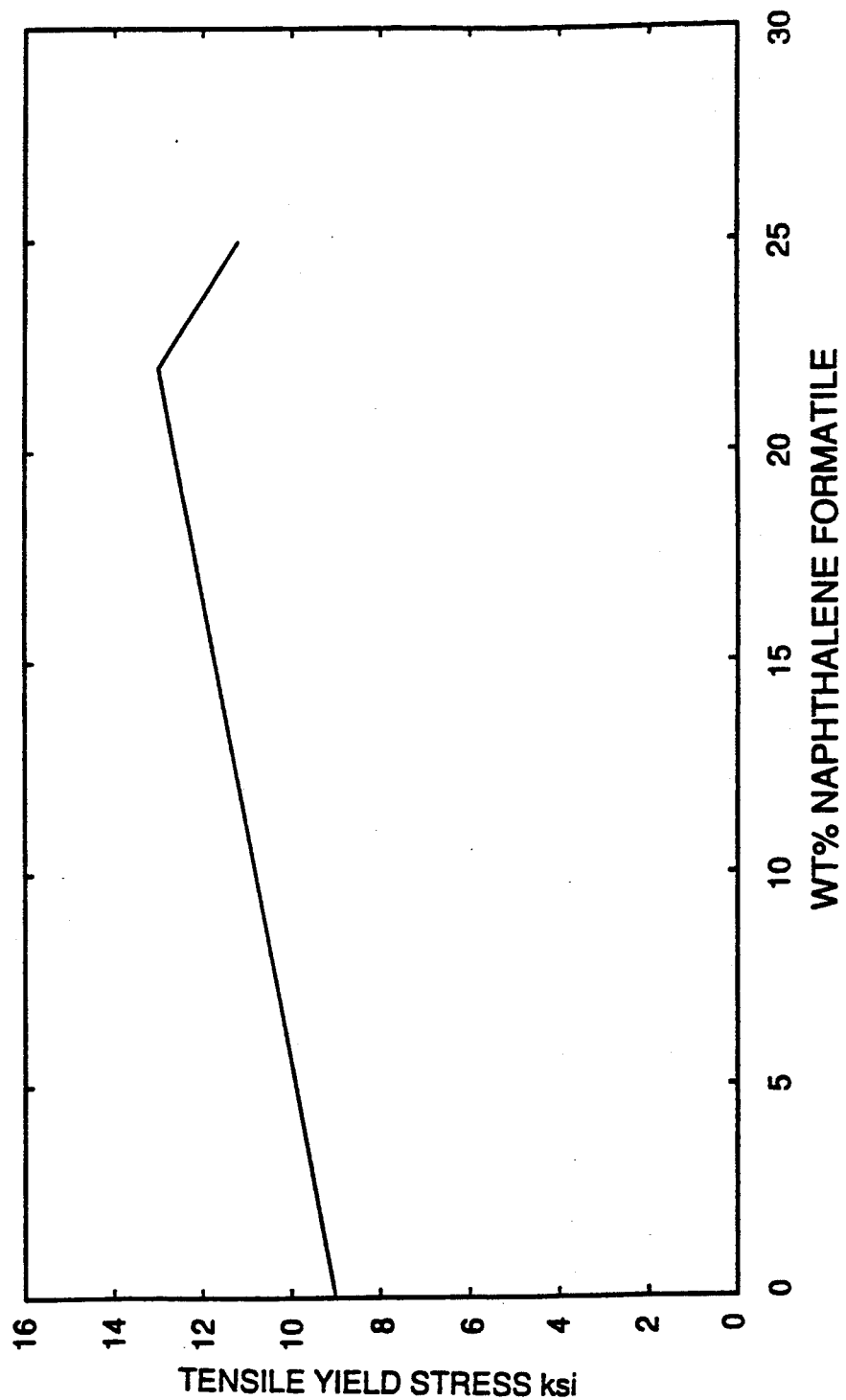
FIG. 9 shows the effect on yield stress of varying amounts of alkylnaphthalene formalite.
Figure 10:
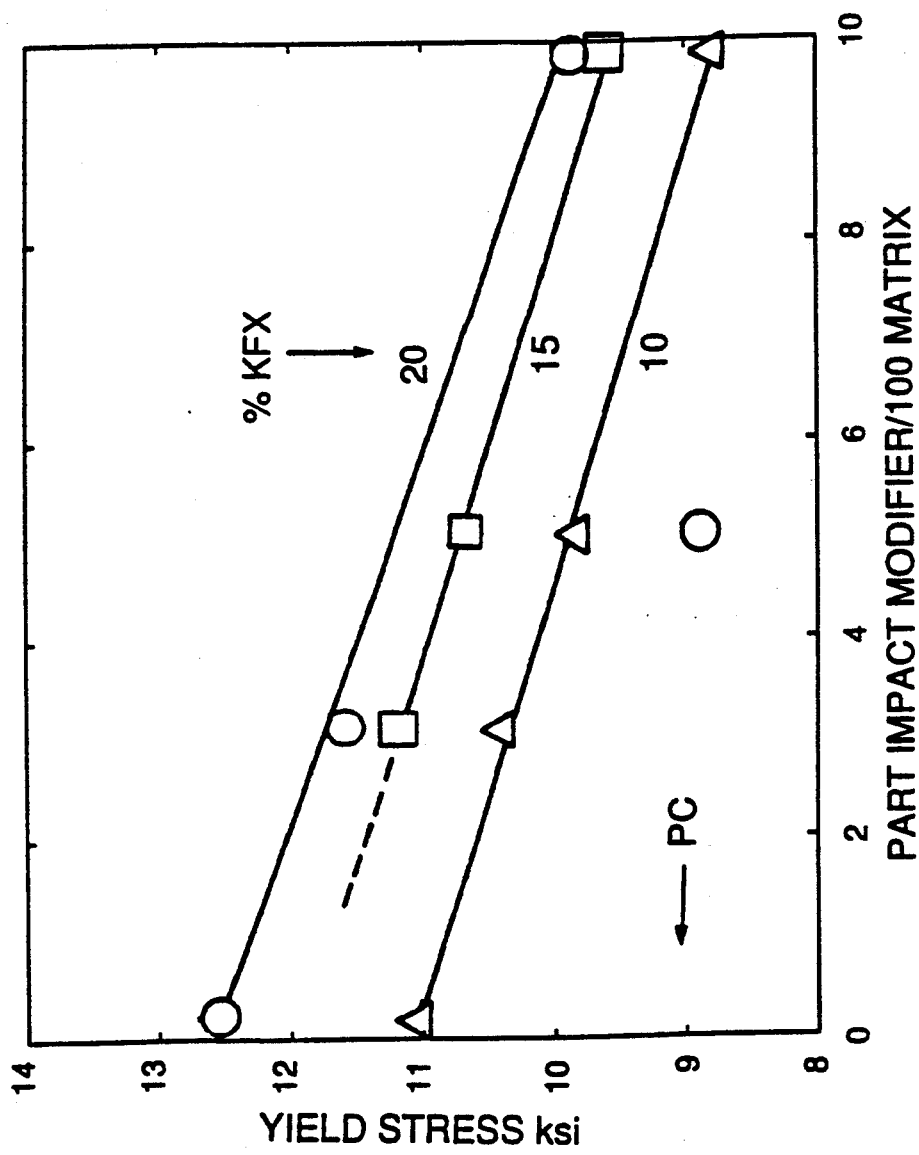
FIG. 10 shows the effects of impact modifier on the yield stress of three polycarbonate/alkylnaphthalene formalite blends.

As with the modulus, alkylnaphthalene formalite raises the tensile strength (FIG. 9). However, brittle failure occurs for alkylnaphthalene formalite contents greater than 20%. The addition of as little as 3% impact modifier causes all blends up to at least 20% alkylnaphthalene formalite to become ductile (FIG. 10). All blends with 10% alkylnaphthalene formalite or more and up to 10% impact modifier have yield stresses equal to or greater than that of neat polycarbonate.

Figure 11:
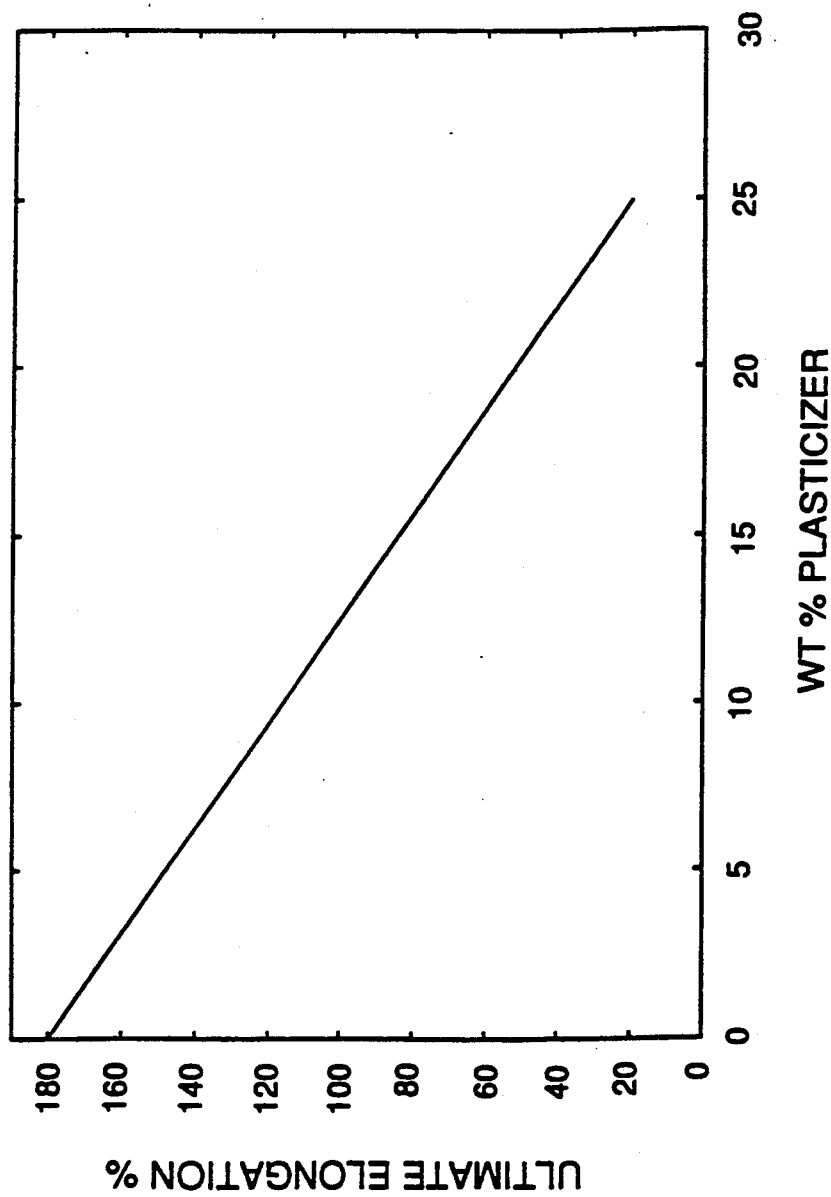
FIG. 11 shows the relationship between the amount of alkylnaphthalene formalite present in the polycarbonate and the ultimate elongation of the blends.
Figure 12:
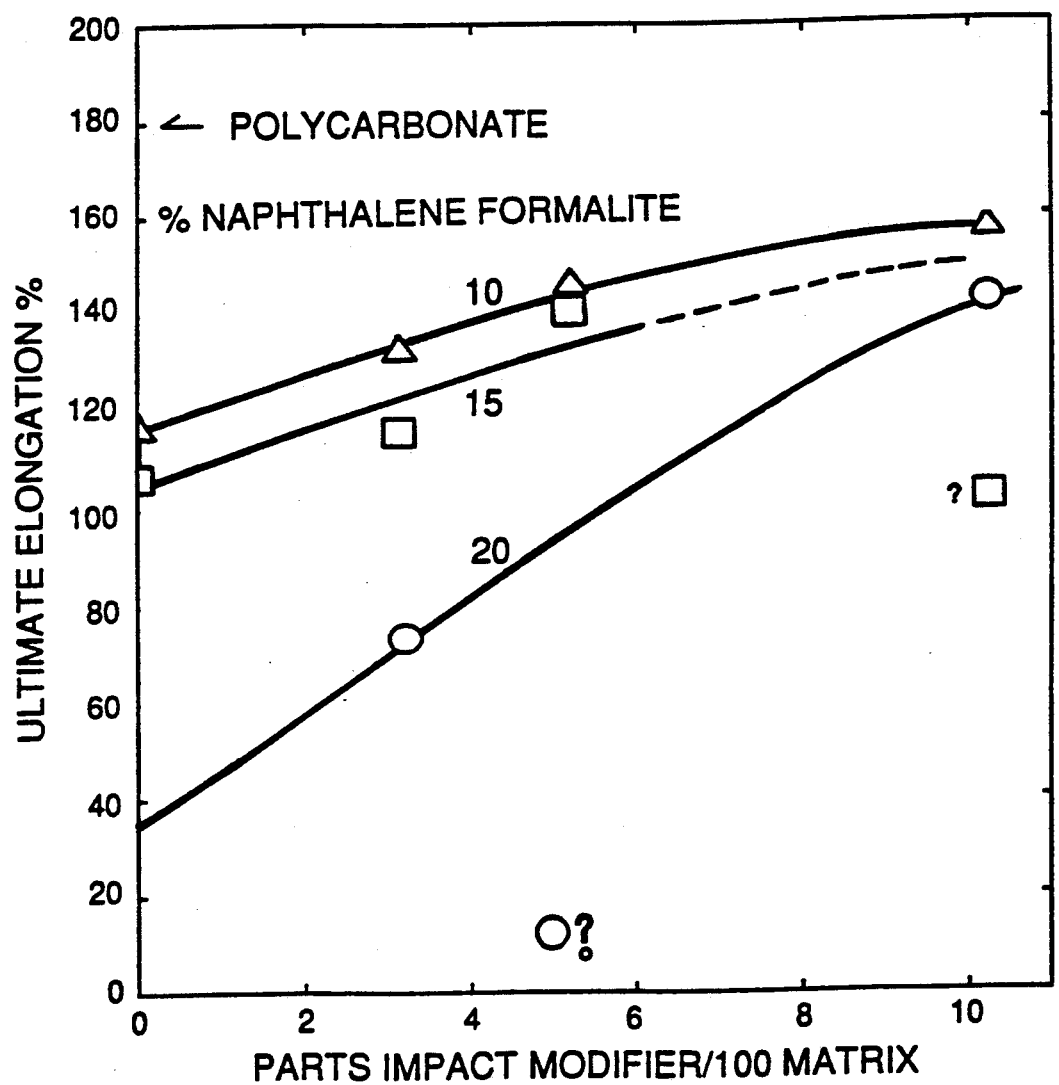
FIG. 12 shows the effects of impact modifier addition on the ultimate elongation of polycarbonate/alkylnaphthalene formalite blends.

Ultimate elongation varies in an approximately linear fashion with addition of alkylnaphthalene formalite to polycarbonate (FIG. 11). The addition of impact modifier to polycarbonate/alkylnaphthalene formalite blends counteracts the adverse effects of alkylnaphthalene formalite on elongation to a large degree, the more so at higher alkylnaphthalene formalite levels (FIG. 12).

Figure 13:
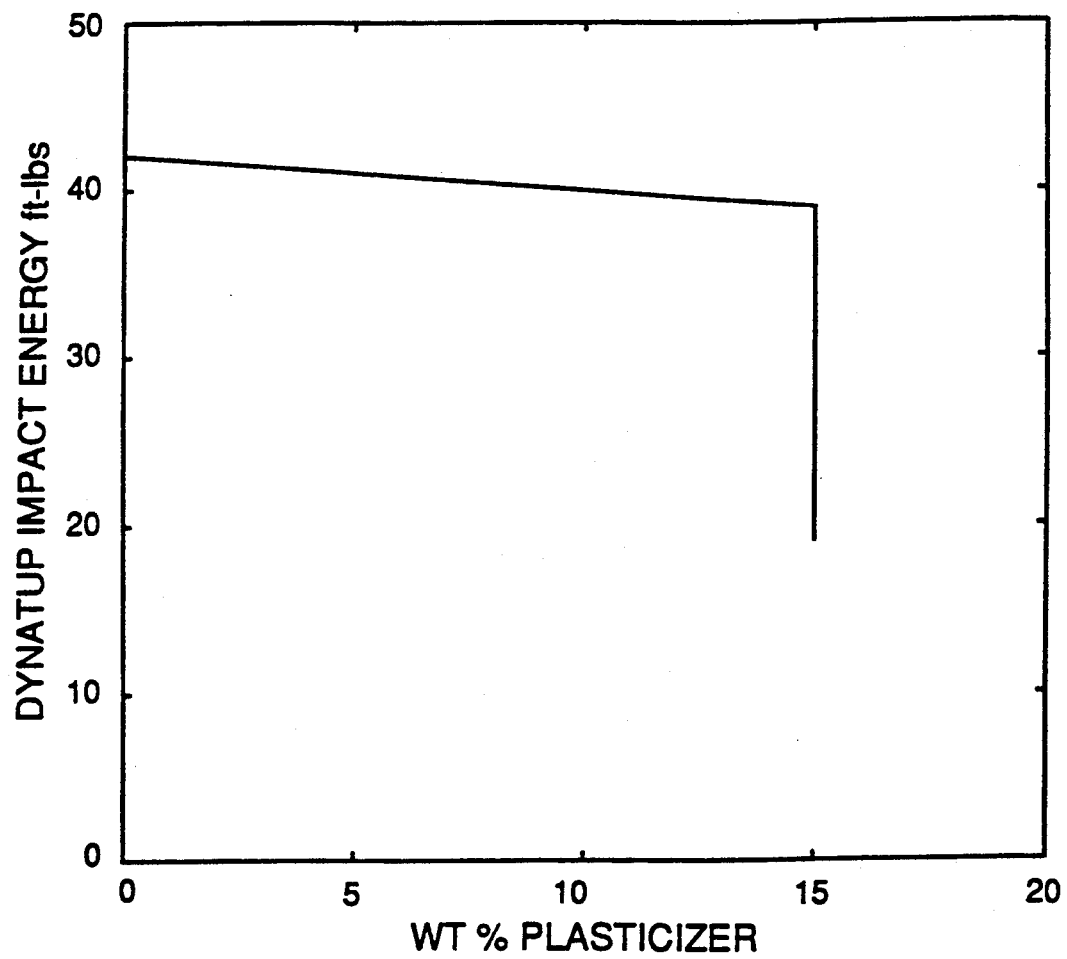
FIG. 13 shows the Dynatup impact energies of polycarbonate/alkylnaphthalene formalite blends.
Figure 14:
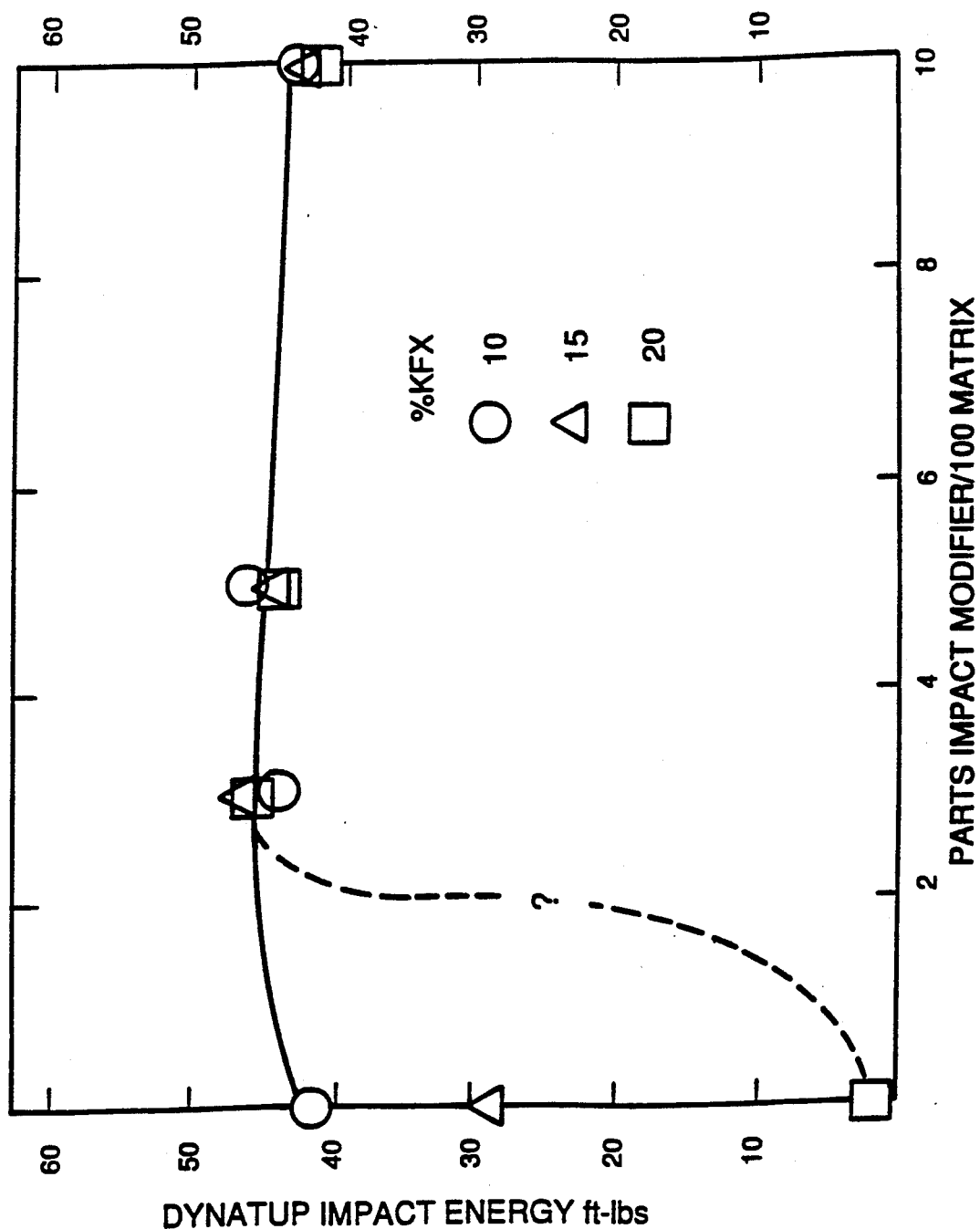
FIG. 14 shows the dependence of Dynatup impact energies on impact modifier content in three polycarbonate/alkylnaphthalene formalite matrices.

Impact failures of polycarbonate/alkylnaphthalene formalite blends in the Dynatup test are ductile up to about 15% alkylnaphthalene formalite and brittle thereafter (FIG. 13). However, the addition of 3% or less impact modifier makes all polycarbonate/alkylnaphthalene formalite blends up to at least 15% alkylnaphthalene formalite ductile at ambient temperature (FIG. 14).

Dynatup failures are ductile and energies are greater than 30 ft.-lbs. at −20° and −35° F. for blends with 15% alkylnaphthalene formalite and at least 3% rubber (Table 1). At 20% alkylnaphthalene formalite ductile failure down to −35° F. requires 5 to 10% impact modifier. °F. is used in conjunction with the English ft.-lbs. units, but otherwise °C. is used unless otherwise indicated from the context.

TABLE I

|  | % Impact Modifier (B56) | | |
| --- | --- | --- | --- |
|  | 3 | 5 | 10 |
| 85/15 Polycarbonate/Alkylnaphthalene Formalite | | | |
| 70° F. | 46D | 45D | 43D |
| −20° F. | 33D | 49D | 50D |
| −35° F. | 56D/B | 46D | 50/28D/B |
| 80/20 Polycarbonate/Alkylnaphthalene Formalite | | | |
| 70° F. | 46D | 44D | 42D |
| −20° F. | 45/17D/B | 33D/B | 43D |
| −35° F. | B | 49/13D/B | 47D |

D = Ductile failure
B = Brittle failure

At 20% alkylnaphthalene formalite ductile failure down to −35° F. requires 5 to 10% impact modifier.

Figure 15:
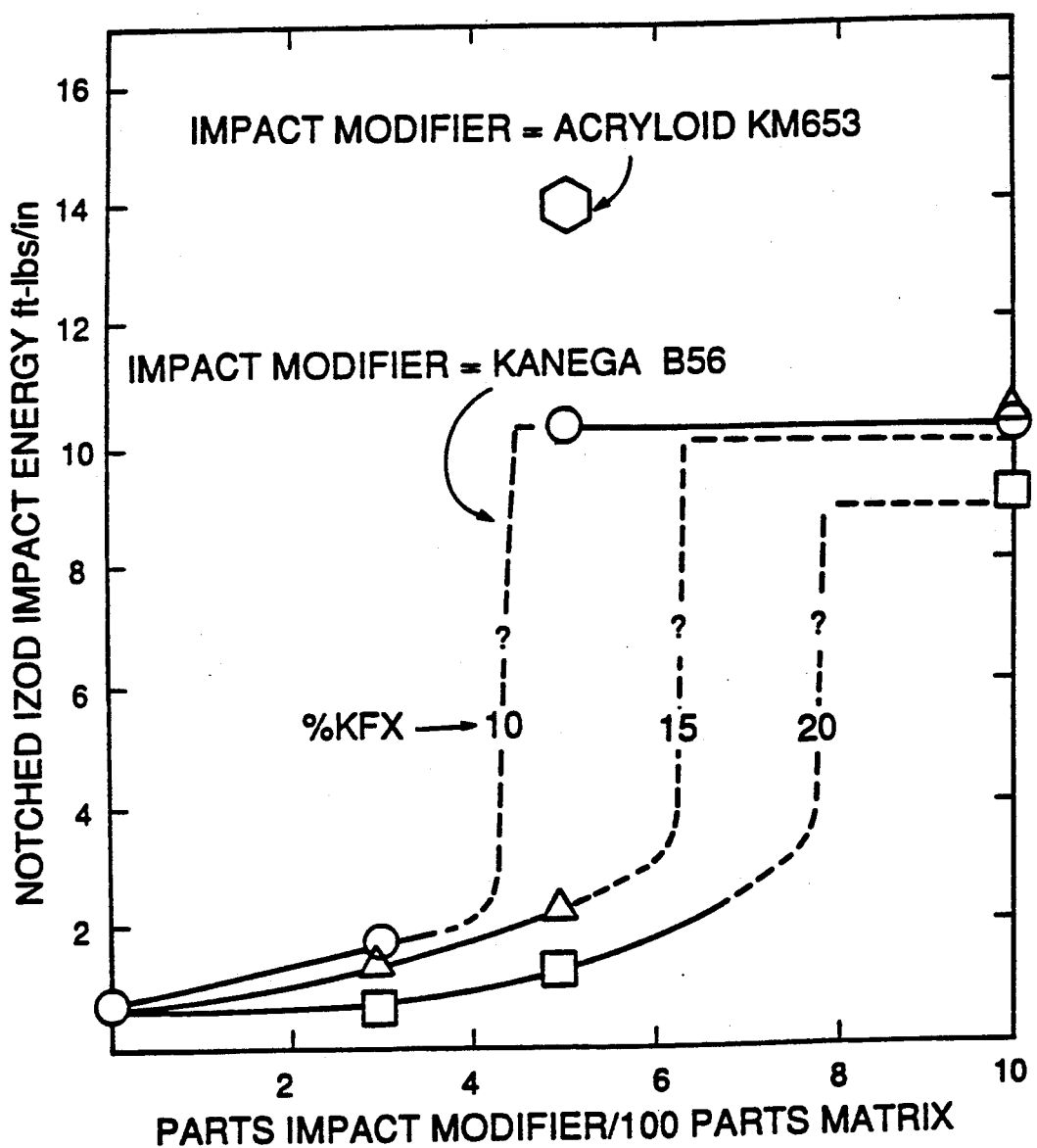
FIG. 15 shows the dependence of notched Izod impact energies on impact modifier content.

Dependence of notched Izod impact behavior at ambient temperature on impact modifier content at three alkylnaphthalene formalite levels in the matrix is shown in FIG. 15. Impact failure is either brittle with an energy of 2 ft.-lbs./in. or less or ductile with an energy of at least 9 ft.-lbs./in. This bimodal behavior is similar to that of neat polycarbonate. The dashed lines connecting the low and high energy branches for each alkylnaphthalene formalite concentration have been sketched in on the basis of this collective experience. It is noteworthy that a single blend made with the core/shell impact modifier Acryloid KM 653 from Rohm & Haas Co. gave a substantially greater impact energy.

Unlike other modulus-increasing agents, neat alkylnaphthalene formalite is qualitatively an unusually hard small molecule agent below its own Tg. (The material is so brittle that attempts to make neat alkylnaphthalene formalite specimens for modulus testing were unsuccessful.)

The yield stresses of polycarbonate/alkylnaphthalene formalite blends are substantially higher than those of neat polycarbonate or those of polycarbonate plasticized with agents that generate low temperature relaxations loosely associated with their own neat Tg's.

The rapid rise in yield stress (and thus drawing stress) in polycarbonate/alkylnaphthalene formalite blends lies at the heart of the greater reduction in ultimate elongation seen with alkylnaphthalene formalite. Associated with this difference is the onset of embrittlement at relatively low concentrations of alkylnaphthalene formalite in both tensile tests and Dynatup tests of the blends without impact modifier.

Incorporation of impact modifier significantly reduces the yield stresses in polycarbonate/alkylnaphthalene formalite blend systems.

In terms of the Dynatup test, three parts of rubber are more than sufficient to bring about ductile, high energy failure. Moreover, the superior Izod toughness of the one blend with KM653 coupled with the differences in uniformity of dispersion of B56 and KM653 suggest the possibility that further reductions of rubber content without loss of ambient Dynatup toughness should be realizable.

The potential reduction in rubber content under discussion above may seem small at first. However, each part of rubber removed raises the modulus 7000 psi and the tensile yield stress by 200 psi roughly and it is precisely the maintenance, or even enhancement, of polycarbonates stiffness, strength and toughness while reducing melt viscosity that make these blends novel and attractive.

Alkylnaphthalene formalite incorporation lowers the UL-94 rating of polycarbonate. This property can be improved, however, by the addition of a drip inhibitor such as polytetrafluoroethylene fibrils.

The data presented above allows physical property profiles to be predicted for blends having (a) Tg's reduced by progressive amounts via alkylnaphthalene formalite addition and (b) sufficient impact modifier for ambient temperature ductile impact response. Since there is a tradeoff between stiffness and ductility, two criteria of ductile response are of interest: (a) a ductile Dynatup response but a brittle Izod response (requires less impact modifier) and (b) ductile responses in both tests (more impact modifier needed). In Table II compositions are defined and property profiles are predicted for a series of such blends. Specifically, sufficient alkylnaphthalene formalite to lower Tg to a given temperature is first defined. This concentration then serves to fix the melt viscosity of the matrix (i.e., no impact modifier); this viscosity is given as a fraction of the melt viscosity of neat polycarbonate at the same temperature.

Broadly, these studies show that the embrittling effects of high-Tg modulus-raising diluents can be counteracted with small amounts of impact modifiers and that "easy-flow" blends with moduli and strengths equalling or exceeding those of neat polycarbonate resin may result.

TABLE II

| | Tg, °C. | | | | | | | |
|---|---|---|---|---|---|---|---|---|
| | 130° | | 120° | | 110° | | 100° | |
| | Dynatup Only | Dynatup & Izod | Dynatup Only | Dynatup & Izod | Dynatup Only | Dynatup & Izod | Dynatup Only | Dynatup & Izod |
| Wt. % KFX | 6 | 6 | 11 | 11 | 17 | 17 | 25 | 25 |
| Parts I.M. | 0 | 3 | 2 | 5 | 3 | 7 | 3 | 10 |
| $\mu^*_n/\mu^*_o$ (PC)* | 0.41 | 0.41 | 0.30 | 0.30 | 0.15 | 0.15 | 0.05 | 0.05 |
| Flex Modulus | 380 | 350 | 385 | 365 | 420 | 385 | 450 | 380 |
| Yield Stress | 10,100 | 9500 | 10,500 | 9800 | 11,300 | 11,000 | 12,000 | 10,500 |
| Elongation | 125 | 140 | 130 | 145 | 100 | 120 | 50 | 130 |
| Dynatup | 42 | 42 | 45 | 45 | 45 | 44 | 35 | 43 |
| Notched Izod | 1.0 | 10 | 1.7 | 10 | 1.0 | 10 | 0.2 | 12 |

In Table II above:
Parts I.M. refers to parts impact modifier/100 parts matrix.
Matrix refers to polycarbonate or polycarbonate plus alkylnaphthalene formalite.
*Matrix viscosities (no impact modifier).
Flex Modulus refers to flex modulus in ksi.
Yield Stress refers to yield stress in psi.
Elongation refers to Ultimate Elongation (%).
Dynatup Energy refers to Dynatup energy in ft.-lbs.
Notched Izod refers to ⅛" Notched Izod in ft.-lbs./in.

What is claimed is:

1. A polycarbonate composition comprising 70% to 99% by weight of aromatic polycarbonate, 1% to 20% of an alkylnaphthalene-formaldehyde condensation product in which the average molecule consists essentially of 2-4 alkylnaphthalene moieties joined by methylene radicals and from 0% to 10% of an impact modifier.

2. The composition of claim 1 wherein the alkylnaphthalene-formaldehyde condensation product is present at a level less than 10%.

3. The composition of claim 2 wherein the impact modifier is a butadiene-styrene-methyl methacrylate terpolymer and is present in the amount of 1-10%.

4. The composition of claim 3 wherein the impact modifier is crosslinked to the degree that it is from 90% to 100% insoluble in acetone.

5. The composition of claim 4 wherein the impact modifier contains on a weight percentage basis from 60% to 70% butadiene, from 10% to 30% methyl methacrylate and from 10% to 20% styrene units.

6. The composition of claim 2 wherein the impact modifier is present at a level of greater than 3%.

7. The composition of claim 1 wherein the polycarbonate is a bisphenol A polycarbonate.

8. A polycarbonate composition containing alkylnaphthalene-formaldehyde condensation product in which the average molecule consists essentially of 2-4 alkylnaphthalene moieties joined by methylene radicals in an amount to increase tensile strength to a value greater than that of a corresponding neat polycarbonate and an impact modifier in an amount to increase impact strength to a value greater than that of the corresponding neat polycarbonate.

9. The composition of claim 8 wherein the polycarbonate is a bisphenol A polycarbonate.

10. A polycarbonate composition containing alkylnaphthalene-formaldehyde condensation product in which the average molecule consists essentially of 2-4 alkylnaphthalene moieties joined by methylene radicals in an amount to increase modulus to a value greater than that of the corresponding neat polycarbonate and an impact modifier in an amount to increase impact strength to a value greater than that of the corresponding neat polycarbonate.

11. The composition of claim 10 wherein the polycarbonate is a bisphenol A polycarbonate.

* * * * *